(12) United States Patent
Lüscher

(10) Patent No.: US 7,153,252 B2
(45) Date of Patent: Dec. 26, 2006

(54) STORAGE ARRANGEMENT FOR MACHINE TOOLS

(75) Inventor: Thomas Lüscher, Staffelbach-Wittwil (CH)

(73) Assignee: Mikron Comp-Tec AG, Nidau (CH)

( * ) Notice: Subject to any disclaimer, the term of this patent is extended or adjusted under 35 U.S.C. 154(b) by 21 days.

(21) Appl. No.: 11/149,924

(22) Filed: Jun. 10, 2005

(65) Prior Publication Data

US 2005/0277529 A1  Dec. 15, 2005

(30) Foreign Application Priority Data

Jun. 10, 2004  (DE) ............. 10 2004 028 151

(51) Int. Cl.
*B23Q 3/157* (2006.01)
(52) U.S. Cl. ................. 483/62; 483/61; 483/38; 483/48; 483/49; 483/40; 483/41; 211/1.54; 211/1.53; 211/1.55; 211/70.6
(58) Field of Classification Search ............... 483/38, 483/40–41, 48, 44–46, 49, 51, 58, 60–64, 483/66–67, 53; 211/1.54, 1.53, 1.55, 70.6, 211/69
See application file for complete search history.

(56) References Cited

U.S. PATENT DOCUMENTS

| | | | |
|---|---|---|---|
| 3,312,370 A * | 4/1967 | Kolarich et al. ............. | 483/63 |
| 4,521,950 A * | 6/1985 | Kase et al. ................ | 483/27 |
| 4,587,716 A | 5/1986 | Bytow | |
| 4,698,898 A * | 10/1987 | Horsch .................... | 483/17 |
| 4,920,631 A * | 5/1990 | Novak ..................... | 483/61 |
| 5,107,581 A | 4/1992 | Reuter et al. | |
| 5,222,285 A | 6/1993 | Horikawa | |
| 5,281,194 A * | 1/1994 | Schneider ................. | 483/14 |
| 6,494,821 B1 | 12/2002 | Patel et al. | |
| 6,579,216 B1 * | 6/2003 | Germerodt et al. ......... | 483/51 |
| 6,814,692 B1 | 11/2004 | Mattes et al. | |

FOREIGN PATENT DOCUMENTS

| DE | 199 57 876 | 6/2001 |
|---|---|---|
| WO | WO03/072300 | 9/2003 |

* cited by examiner

*Primary Examiner*—Erica Cadugan
(74) *Attorney, Agent, or Firm*—Bachman & LaPointe, P.C.

(57) ABSTRACT

A storage arrangement (1) for machine tools is proposed, comprising at least two storage shelves (12) arranged vertically one above the other and in each case having a multiplicity of tool or workpiece retainers (14), the tool or workpiece retainers (14) being arranged in a circle, and a movable gripping arm (16) which is rotatably arranged about an axis through the center of the circle formed by the storage retainers (14) and which furthermore is arranged so as to be movable in the vertical direction with respect to the storage shelves (12) and which furthermore is arranged so as to be movable horizontally and radially from the circle center, the gripping arm (16), during its horizontal movement, covering at most a distance which corresponds to the radius of the circle formed by the storage retainers (14).

9 Claims, 5 Drawing Sheets

STORAGE ARRANGEMENT FOR MACHINE TOOLS

BACKGROUND OF THE INVENTION

The invention relates to a storage arrangement for machine tools, comprising at least two storage shelves arranged vertically one above the other and in each case having a multiplicity of tool and/or workpiece retainers, the tool or workpiece retainers being arranged in a circle, and a movable gripping arm which is rotatably arranged about an axis through the center of the circle formed by the retainers and which furthermore is arranged so as to be movable in the vertical direction with respect to the storage shelves and which furthermore is arranged so as to be movable horizontally and radially from the circle center.

For the machining of workpieces made of metal, plastic or other materials, programmable "machining centers" monitored by the computer are being increasingly used. A machining center essentially comprises a table on which a workpiece can be held in a defined position during the machining. "Pallets" or work carriers serve for the defined fastening of the workpieces. For the machining of the workpiece, a wide variety of tools are used, for example for drilling, milling, broaching, sawing, cutting or planing. Depending on the form of the initial material and depending on the form of the desired finished product, the workpiece can be machined from several sides. The workpieces and tools can be moved linearly and/or rotationally with respect to one another. Three to six axes are defined for the movement: X, Y and Z for the linear movements and A, B and C for the rotary movements. In order to achieve efficient series production, a multiplicity of machining steps with various tools on a number of workpieces are programmed in advance for a relatively long time segment. The tools also become worn due to the machining. A multiplicity of tool changes are therefore necessary. For the neat grouping of the tools and of the unmachined and machined workpieces, storage arrangements are provided which are operated by program-controlled manipulators or industrial robots. The "chip-to-chip" tool change time, i.e. the time which the machine requires for the changing of the tool, is to be as short as possible for a high efficiency. The preparation time, i.e. the time during which the machine is continuously in readiness for the further tools, likewise contributes decisively to the increase in efficiency. The energy consumption during the tool or workpiece change is to be kept as low as possible.

WO 2003072300 A1 discloses an arrangement for changing and storing tools for a machining center. A multiplicity of tool retainers are formed on the inner circumference of a ring-segment-shaped frame. A rotatable arm has two gripping devices, the first gripping device serving to store the tools and the second gripping device serving to withdraw the tools from storage. The gripping devices have an embossment or a bevel which interacts with a finger on the tool retainer. This achieves the effect that the tool is stored and withdrawn from storage with a defined orientation.

The object of the invention is to specify a storage arrangement for machine tools which permits machining which is as efficient as possible and is as favorable as possible in terms of energy.

SUMMARY OF THE INVENTION

The object is achieved by a storage arrangement for machine tools, comprising at least two storage shelves arranged vertically one above the other and in each case having a multiplicity of tool and/or workpiece retainers, the tool or workpiece retainers being arranged in a circle, and a movable gripping arm which is rotatably arranged about an axis through the center of the circle formed by the retainers and which furthermore is arranged so as to be movable in the vertical direction with respect to the storage shelves and which furthermore is arranged so as to be movable horizontally and radially from the circle center, the gripping arm, during its horizontal movement, covering at most a distance which corresponds to the radius of the circle formed by the retainers. The radial movement of the gripping arm is limited to the absolute minimum.

It is advantageous that the storage arrangement can be attached to the machine tool in any desired manner. This is achieved by a transfer opening being formed in an outer wall, running vertically, of the storage arrangement. This is also achieved by the storage shelves being composed of storage modules in a modular manner.

It is also advantageous that the storage arrangement has minimum energy consumption. This is achieved by the gripping arm having a single gripping retainer for the workpieces or tools.

Furthermore, it is also advantageous that the preparation time for the tools and/or workpieces is minimal. This is achieved by the fact that the working steps "withdrawal or storing" of the tool and "removing or installing" of the tool are carried out by two spatially separate manipulators working simultaneously.

BRIEF DESCRIPTION OF THE DRAWINGS

An exemplary embodiment of the invention is described with reference to the figures. In the drawing.

DETAILED DESCRIPTION

Figure 1:
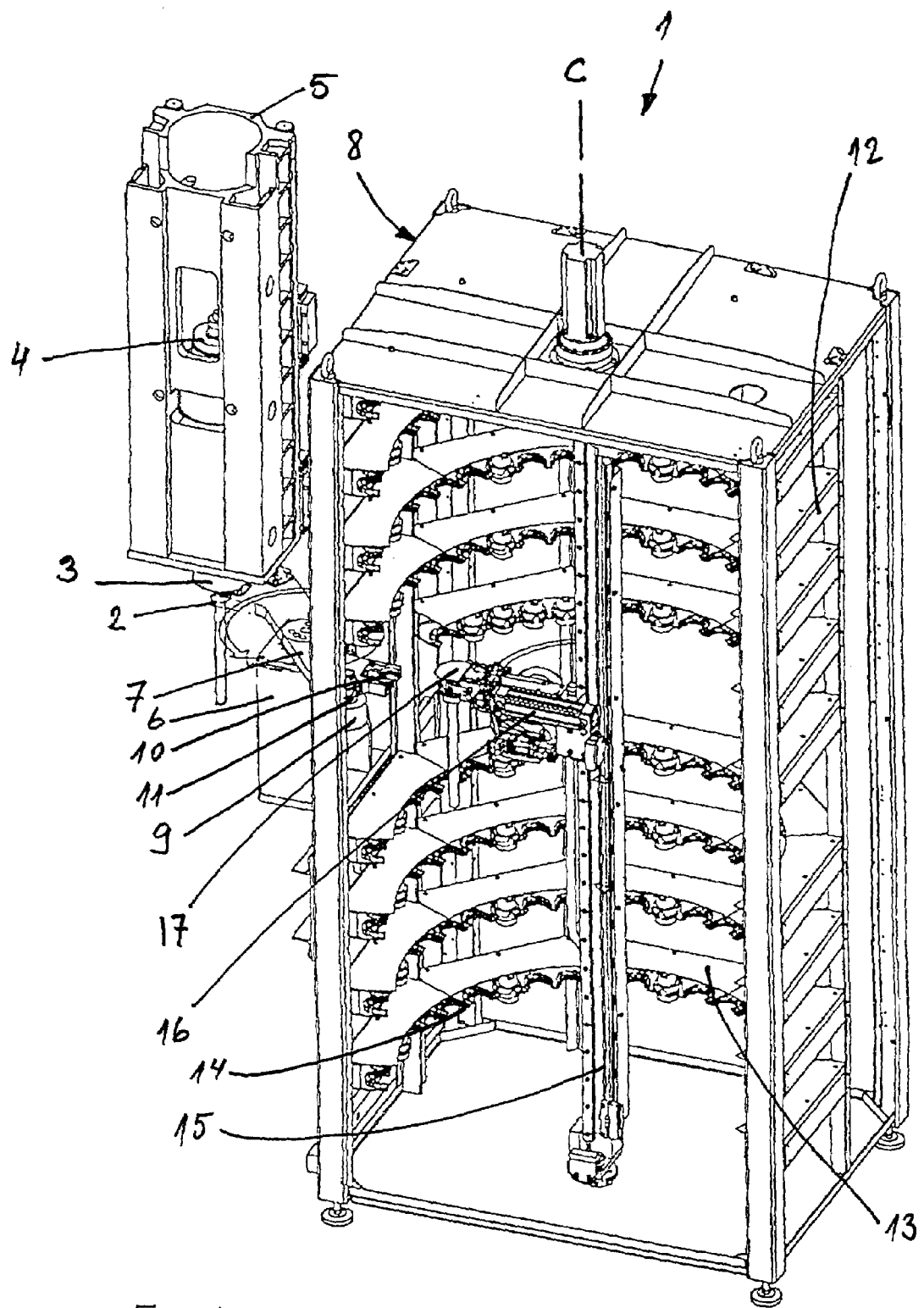
FIG. 1 shows a perspective view of a storage arrangement according to the invention for machine tools.

A storage arrangement 1 for a machine tool is shown in a perspective view in FIG. 1. Of the machine tool, only a tool spindle 2, a tool holder 3, a spindle drive motor 4 and a spindle guide slide 5 are shown. A transfer station 6 having a change arm 7 is arranged between the machine tool and the actual storage arrangement 1. The transfer station 6 is fastened in a free-standing manner on the machine base. The change arm 7 is driven by a computer-controlled servomotor 9 and performs merely a circular movement about the drive axis of the servomotor 9. At its free end, the change arm 7 has two transfer retainers 10, 11 for tools and/or workpieces and is therefore also designated as double change arm.

The actual storage arrangement 1 is designed like a tower rack and, in the present exemplary embodiment, contains nine storage shelves 12 arranged one above the other. Each storage shelf 12 is composed of five circle-segment-shaped storage modules 13. A storage shelf 12 comprises at least five eighths of a circle, but may also be composed of six or seven eighths. Five storage retainers 14 for tools and/or workpieces are formed in each module 13. The storage retainers 14 in the storage shelves 12 have the same functions and the same dimensions as the transfer retainers 10, 11 on the double change arm 7. Depending on the size of the tools and/or workpieces, more or fewer storage retainers 14 may be formed per storage module 13. The distance from one storage shelf to the next is determined by the maximum size of the tool.

The modular construction of the tower rack permits subsequent expansion of the storage capacity of the storage arrangement 1. In the present example, space for more than 200 storage retainers 14 is provided. The tower rack is a simple modular construction which can be closed off with wall plates and thus forms a robustly composed storage unit. A plurality of tool storage arrangements 1 for a plurality of machines can be connected to one another via crane systems (not shown here) placed above them. The tools can then be fed and discharged via the top part at the respective tool store.

The storage retainers 14 are arranged in a circle. A guide 15 is arranged at the center of this circle. The guide 15 carries a gripping arm 16 and is itself arranged so as to be rotatable about the axis C through the center of the circle, which is formed by the retainers 14. The gripping arm 16 is designed as a guide slide in the horizontal direction and has a single gripping retainer 17 at its free end. The gripping retainer 17 is arranged on the gripping arm 16 in a linearly movable manner. The gripping arm 16 together with the gripping retainer 17 can therefore perform a vertical, a horizontal and a radial movement. The radial movement of the gripping arm 16 is not larger than necessary for the movement of the tools and/or workpieces into and from the storage retainers 14 of the storage shelf 12. Since the gripping arm 16 does not need to perform any relatively large movements, the gripping arm 16 also does not exert any relatively large torque on the guide 15 in the loaded state. The gripping arm 16 moves only one tool or workpiece in each case. The remaining tools are mounted in a stationary position in the storage retainers 14. No unnecessary masses need to be moved, which leads to a type of construction of the storage arrangement 1 which is as light as possible and is as favorable as possible in terms of energy.

Figure 2:
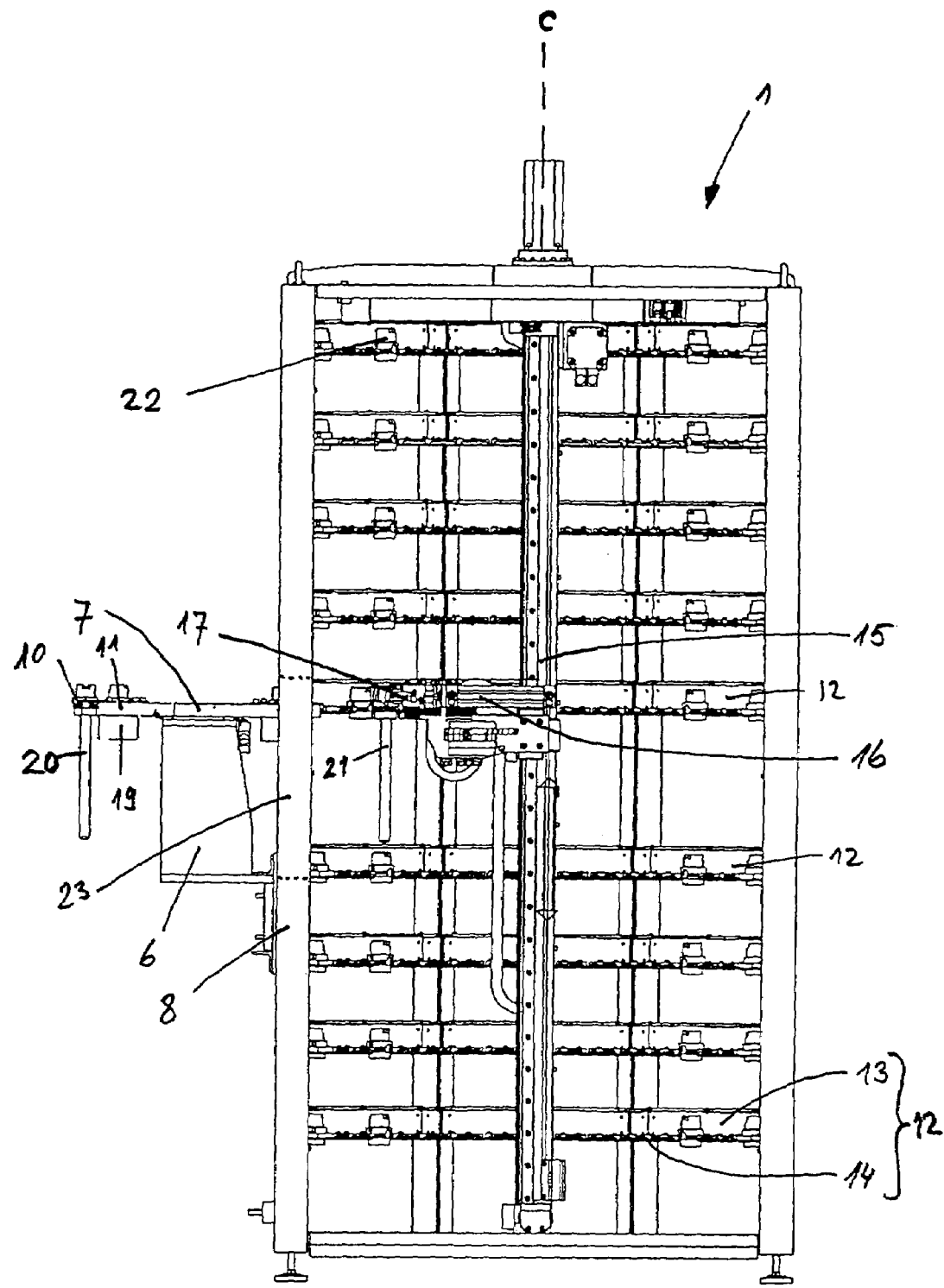
FIG. 2 shows a side view of the arrangement in FIG. 1.

FIG. 2 shows the storage arrangement 1 in a front view. The same reference numbers relate to the same features as in FIG. 1. It can be seen in FIG. 2 how the transfer station 6 is fastened to the side wall 8 of the storage arrangement 1 halfway between two storage shelves 12. However, the level can be adapted to the respective machine tool. A tool 19 is located in the transfer retainer 11 of the change arm 7, a further tool or workpiece 20 is located in the transfer retainer 10, a further tool 21 is located in the gripping retainer 17 of the gripping arm 16, and a further tool or workpiece 22 is located in the storage shelf 12 arranged right at the top. A free space, in which a transfer opening 23 for the transfer station 6 has been formed, has been left between two storage shelves 12.

Figure 3:
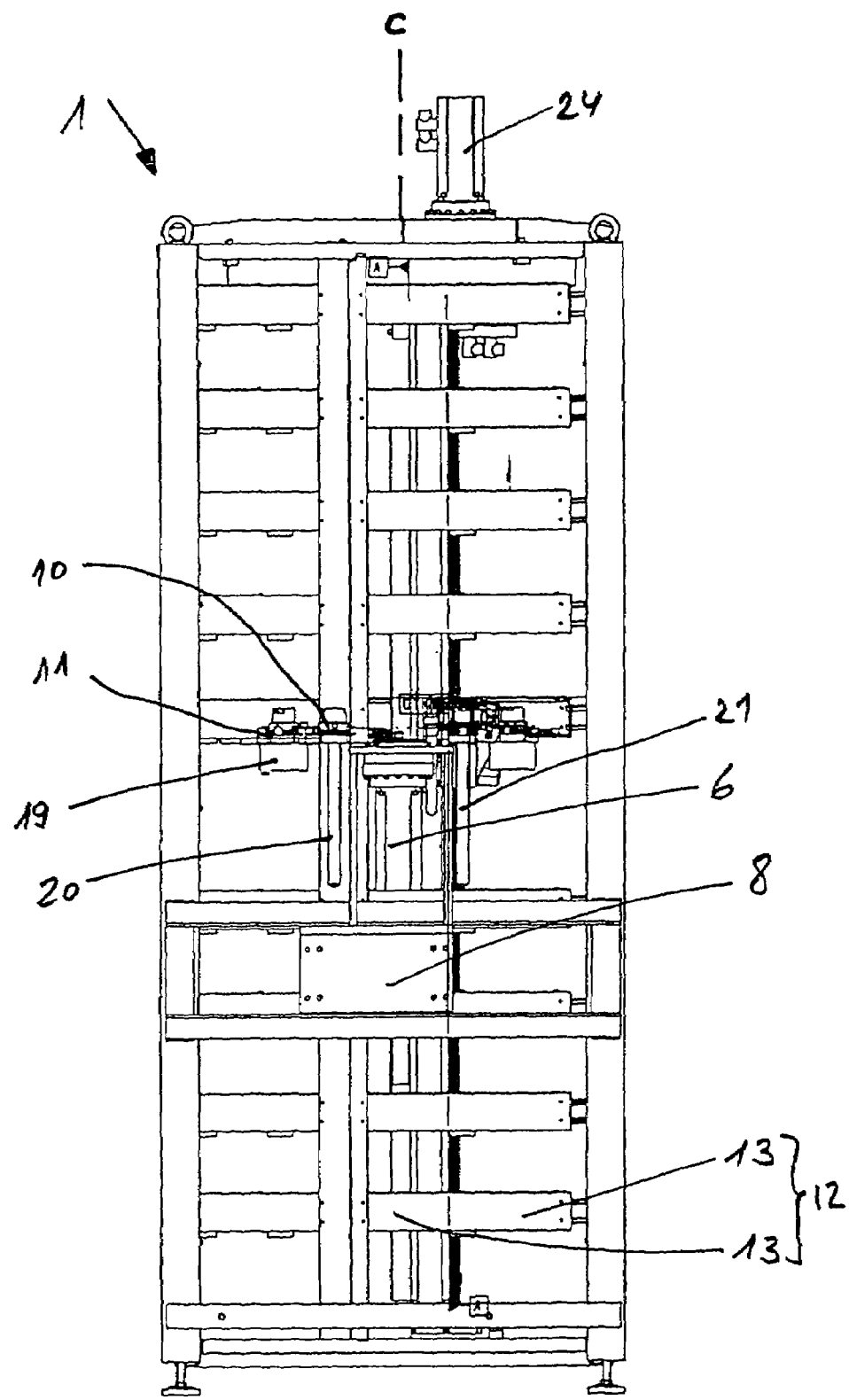
FIG. 3 shows a further side view of the arrangement in FIG. 1.

FIG. 3 shows the storage arrangement 1 as viewed toward the side wall 8. The storage modules 13, which together form the storage shelf 12, are covered with a sheet-metal plate bent at right angles. The cover protects the storage retainers 14 from contamination from the outside and prevents cooling and lubricating fluid from dripping onto the tools from the storage shelves lying at the top. A drive motor 24, which serves for the rotatable drive of the guide 15 about the axis C, can be seen at the top on the storage arrangement 1.

Figure 4:
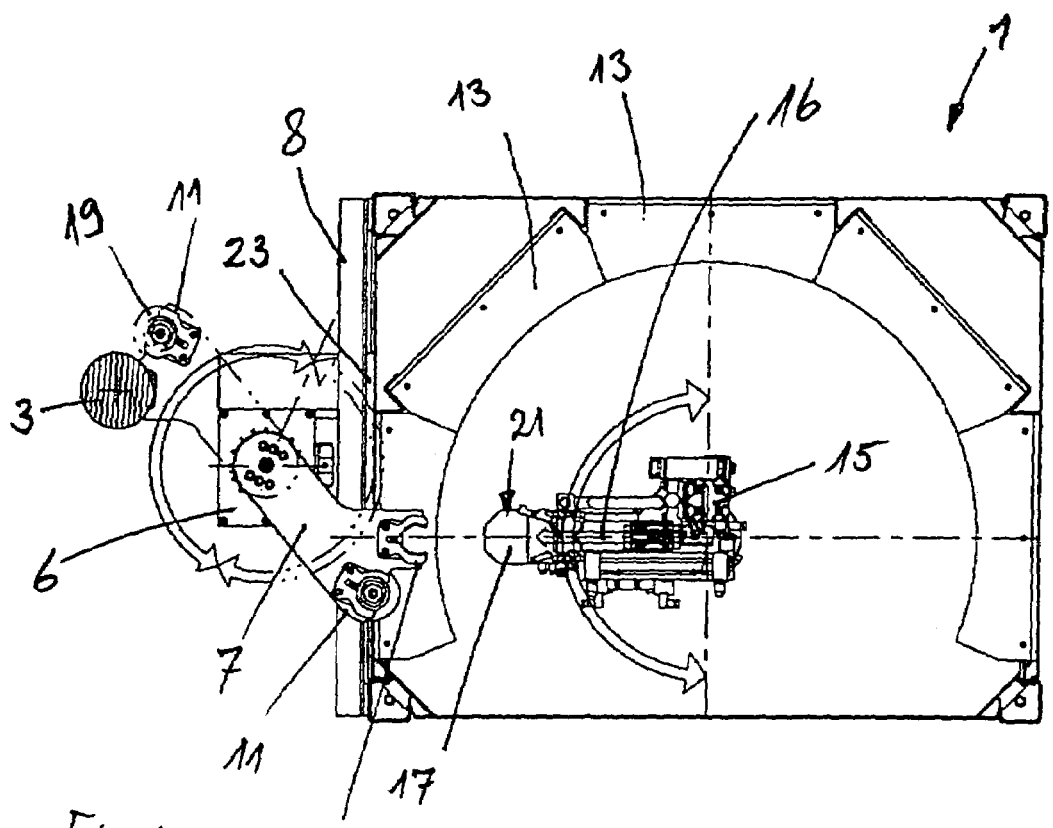
FIG. 4 shows a view from above of a part of the arrangement in FIG. 1.

FIG. 4 shows the storage arrangement 1 in a view from above toward a storage shelf 12. The storage arrangement 1 is shown sectioned in the region of the free space between two storage shelves 12. Here, it can readily be seen how the transfer retainers 10, 11 of the change arm 7 are arranged so as to be movable in a circle, which is tangent to the circle formed by the storage retainers 14. Broken lines show how the change arm 7 changes from a first transfer position in the storage arrangement 1 to a second transfer position in the machine tool. The gripping retainer 17 of the gripping arm 16 is located in the radially retracted position. In this position, the gripping arm 16 can be moved from the transfer station 6 to one of the numerous storage retainers 14 by a rotary movement of the gripping arm 16 in the horizontal plane and/or by a vertical movement along the guide 15.

The change arm 7 and the gripping arm 16 are driven and controlled independently of one another and can be moved simultaneously. Due to this independence and by means of a suitable control, the tool 21 can be stored or withdrawn from storage, while the other tool 19 is transferred to the machine tool and exchanged. The maximum turning circle of the gripping arm 16 and the turning circle of the change arm 7 touch one another only at one point, namely during the changing of the tool from the gripping arm 16 to the change arm 7 or vice versa. Due to the separation of the tool storage and the tool change, the downtime of the machine tool can be considerably reduced. The short machining times which are thus achieved result in an unparalleled efficiency for the machining center.

Figure 5:
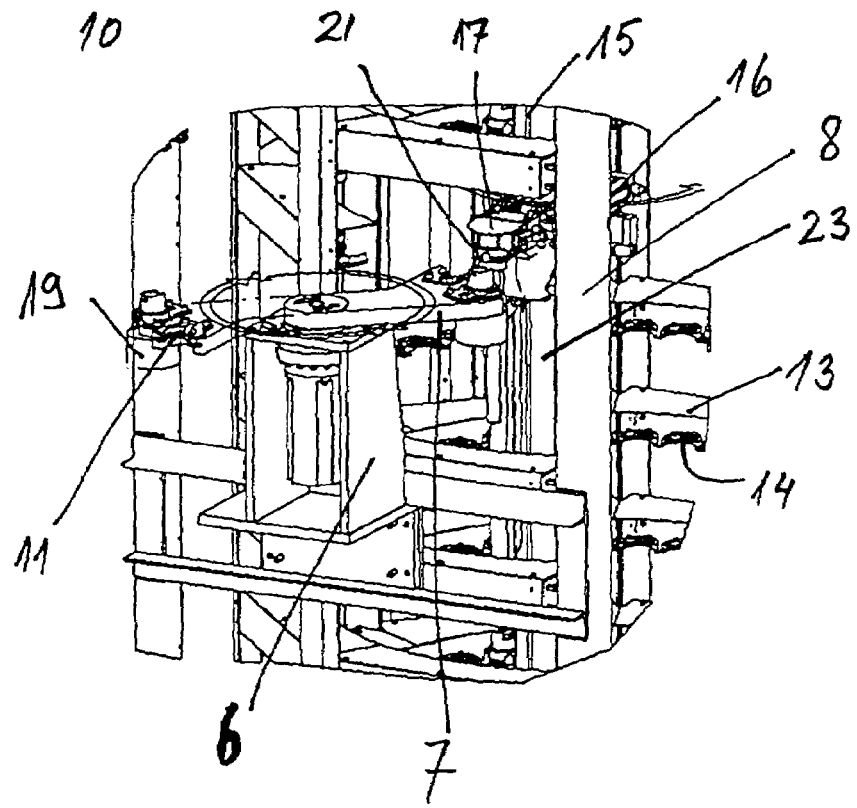
FIG. 5 shows a perspective view of a detail of the arrangement in FIG. 1.

The transfer of a tool from the gripping arm 16 to the change arm 7 is shown schematically in FIG. 5. The change arm 7 has two transfer retainers 10, 11, whereas the gripping arm 16 has merely one gripping retainer 17. In each case one of the transfer retainers 10, 11 is actuated on the side of the storage arrangement 1 and another is actuated on the side of the machine tool.

Figure 6:
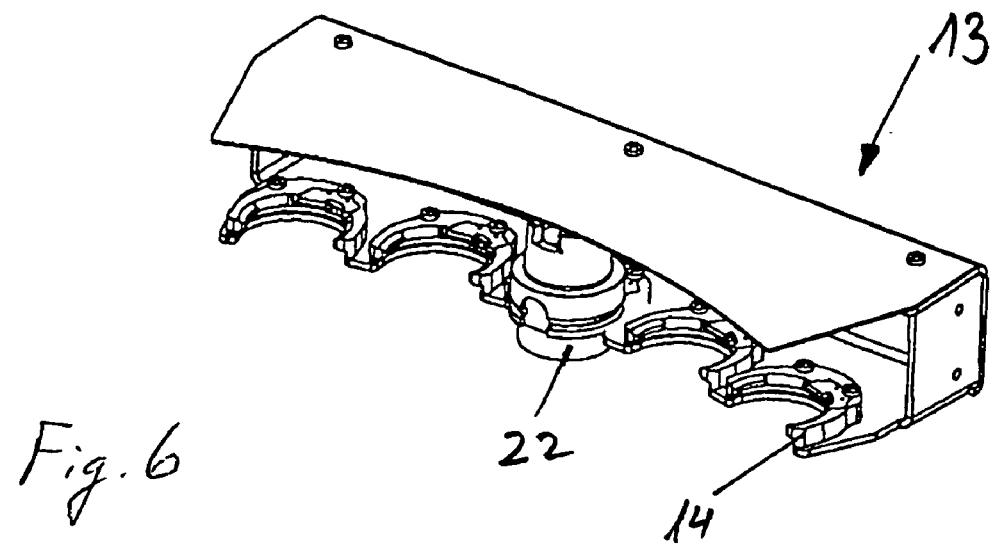
FIG. 6 shows a perspective view of a part of the storage arrangement.

An individual storage module 13 having five storage retainers 14 is shown in a perspective view in FIG. 6. Here, it can readily be seen how the tools and/or workpieces can be protected against contamination and from liquid dripping down.

Figure 7:
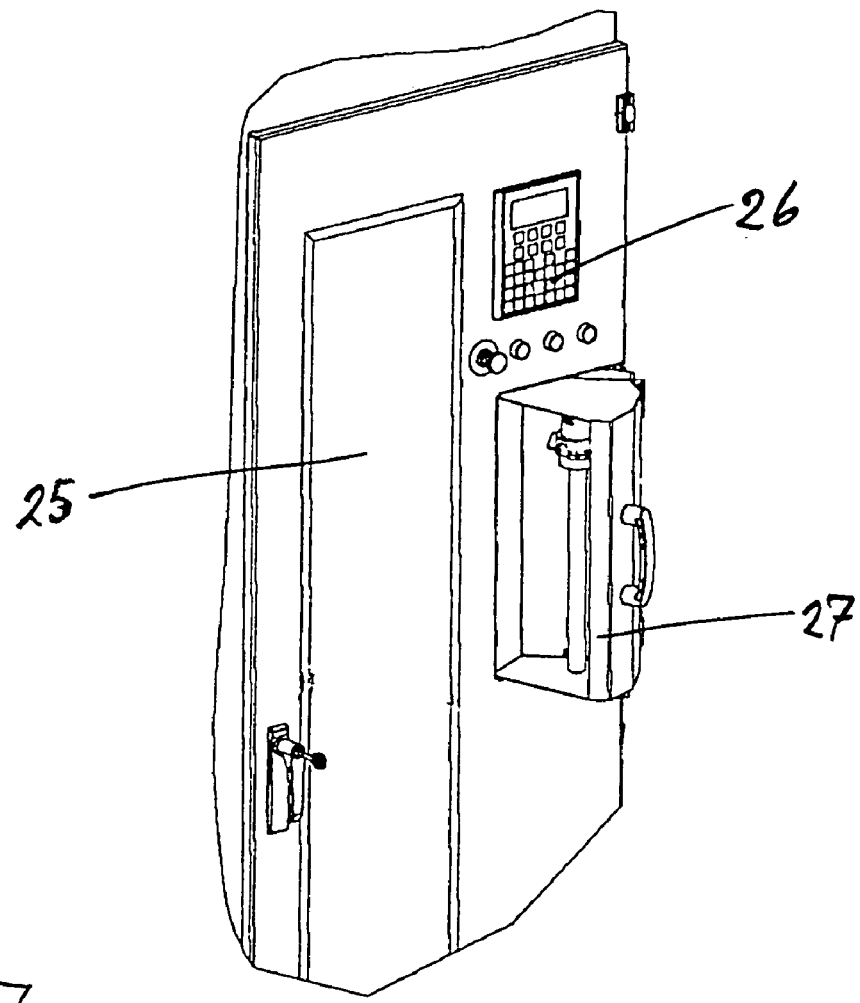
FIG. 7 shows a perspective view of a further detail of the storage arrangement in FIG. 1.

An access door 25 with an operating console 26 and an insertion station 27 for inserting individual tools or workpieces is shown schematically in FIG. 7. The insertion station 27 is located at an ergonomically favorable level, but on another side of the storage arrangement 1, opposite or next to the transfer station 6. Depending on the space conditions, the access door 25 may be arranged on the side wall opposite the side wall 8 or on the front wall, lying in between, of the storage arrangement 1.

Since the storage arrangement 1 is of modular construction, it can be attached to a machine tool in any desired manner. The tower rack can be extended vertically in any desired manner. It is also conceivable to attach two storage arrangements 1 designed in mirror image to a single machine tool. The tower rack is designed as a simple but nonetheless robust sheet-metal structure. Since only one tool is moved in each case in the tower rack by the gripping arm 16 over as short a distance as possible, the expenditure of energy for the storing and withdrawal from storage is restricted to the absolute minimum. The gripping arm 16 is designed as a simple three-axis manipulator with servomotors. The change arm 7 is a simple rotatable arm which can be stopped in at least four different angular positions by a computer-controlled servomotor.

The invention claimed is:

1. A storage arrangement (1) for machine tools, comprising at least two storage shelves (12) arranged vertically one above the other and each having a multiplicity of tool retainers (14), wherein the tool retainers (14) being arranged in a circle, and a movable gripping arm (16) which is (a) rotatably arranged about an axis through a center of a circle formed by the tool retainers (14), (b) movable in a vertical direction with respect to the storage shelves (12) and (c) movable horizontally and radially from the circle center, wherein the gripping arm (16), during its horizontal movement, covers at most a distance which corresponds to the radius of the circle formed by the storage retainers (14).

2. The storage arrangement (1) as claimed in claim 1, wherein a free space is formed between the at least two of the storage shelves (12) arranged vertically one above the other.

3. The storage arrangement (1) as claimed in claim 2, wherein a transfer opening (23) is formed in the region of the free space in an outer wall (8) of the storage arrangement (1).

4. The storage arrangement (1) as claimed in claim 3, wherein a change arm (7) is arranged to engage the tools in a rotatable manner through the transfer opening (23) between two storage shelves (12).

5. The storage arrangement (1) as claimed in claim 4, wherein the change arm (7) has two transfer retainers (10, 11) for the tools, the transfer retainers (10, 11) being arranged in a circle.

6. The storage arrangement (1) as claimed in claim 5, wherein, during rotary movement of the change arm (7), the transfer retainers (10, 11) define a circle which is tangent to the circle formed by the storage retainers (14).

7. The storage arrangement (1) as claimed in claim 1, wherein the gripping arm (16) has a single gripping retainer (17) for the tools.

8. The storage arrangement (1) as claimed in claim 1, wherein the storage shelves (12) comprise modular storage modules (13).

9. The storage arrangement (1) as claimed in claim 1, wherein the storage shelves (12) are arranged in a circle and each comprise at least five eighths of a circle.

\* \* \* \* \*